United States Patent
Nunami et al.

(10) Patent No.: US 8,995,077 B1
(45) Date of Patent: Mar. 31, 2015

(54) ELECTRONIC DEVICE, METHOD AND STORAGE MEDIUM

(71) Applicant: Kabushiki Kaisha Toshiba, Minato-ku, Tokyo (JP)

(72) Inventors: Tsukasa Nunami, Ome Tokyo (JP); Yoshihiro Kaneko, Fussa Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/496,675

(22) Filed: Sep. 25, 2014

(30) Foreign Application Priority Data

Nov. 28, 2013 (JP) ................................ 2013-245740

(51) Int. Cl.
 *G11B 19/04* (2006.01)
(52) U.S. Cl.
 CPC .................................... *G11B 19/042* (2013.01)
 USPC .................................. 360/55; 360/60; 360/75
(58) Field of Classification Search
 None
 See application file for complete search history.

(56) References Cited

U.S. PATENT DOCUMENTS

| | | | |
|---|---|---|---|
| 6,822,821 B2 * | 11/2004 | Gan et al. ......................... | 360/75 |
| 7,042,663 B2 * | 5/2006 | Shimotono et al. ............. | 360/75 |
| 7,142,385 B2 | 11/2006 | Shimotono et al. | |
| 7,154,692 B2 * | 12/2006 | Ogawa et al. .................... | 360/61 |
| 7,336,437 B2 * | 2/2008 | Cho .................................. | 360/75 |
| 7,382,566 B2 * | 6/2008 | Shimotono et al. ............. | 360/75 |
| 7,397,626 B2 * | 7/2008 | Aoki et al. ....................... | 360/75 |
| 7,474,970 B2 * | 1/2009 | Miyoshi et al. .................. | 360/75 |
| 7,495,858 B2 | 2/2009 | Miyoshi et al. | |
| 7,496,470 B2 | 2/2009 | Nakamura et al. | |
| 7,558,013 B2 * | 7/2009 | Jeansonne et al. .............. | 360/75 |
| 7,663,833 B2 * | 2/2010 | Aoki et al. ....................... | 360/75 |
| 7,706,097 B2 * | 4/2010 | Kuroki et al. .................... | 360/75 |
| 7,800,855 B2 * | 9/2010 | Kuramoto et al. .............. | 360/75 |
| 7,813,074 B2 * | 10/2010 | Shimotono et al. ............. | 360/75 |
| 7,903,365 B2 * | 3/2011 | Watanabe ........................ | 360/75 |
| 8,060,336 B2 | 11/2011 | Nakamura et al. | |
| 8,131,499 B2 | 3/2012 | Nakamura et al. | |
| 8,320,070 B2 * | 11/2012 | Yoshida .......................... | 360/75 |
| 8,532,955 B2 * | 9/2013 | Tang et al. ...................... | 360/75 |
| 2005/0213242 A1 * | 9/2005 | Fujiki et al. ..................... | 360/75 |
| 2008/0174444 A1 * | 7/2008 | Noda et al. ..................... | 340/669 |
| 2009/0021858 A1 * | 1/2009 | Fu et al. ..................... | 360/99.01 |
| 2010/0259847 A1 * | 10/2010 | Chang et al. .................... | 360/75 |

FOREIGN PATENT DOCUMENTS

| | | |
|---|---|---|
| JP | 2005-190641 A | 7/2005 |
| JP | 2006-172663 A | 6/2006 |
| JP | 2007-179673 A | 7/2007 |
| JP | 2009-140586 A | 6/2009 |

* cited by examiner

*Primary Examiner* — Wayne Young
*Assistant Examiner* — James L Habermehl
(74) *Attorney, Agent, or Firm* — Knobbe, Martens, Olson & Bear LLP

(57) ABSTRACT

According to one embodiment, an electronic device includes a housing, a sensor, a disk device, a first determination controller, a first changing controller. The sensor senses a vibration of the housing. The disk device stores operation data, the disk device including a head, wherein the head retracts to a safety position when the sensed vibration exceeds a sensitivity level, and the operation data includes an evaluated value for evaluating an operation state of the head, and a threshold corresponding to the evaluated value. The first determination controller determines whether the evaluated value exceeds the threshold. The first changing controller changes the sensitivity level based on the result of the first determination controller.

15 Claims, 4 Drawing Sheets

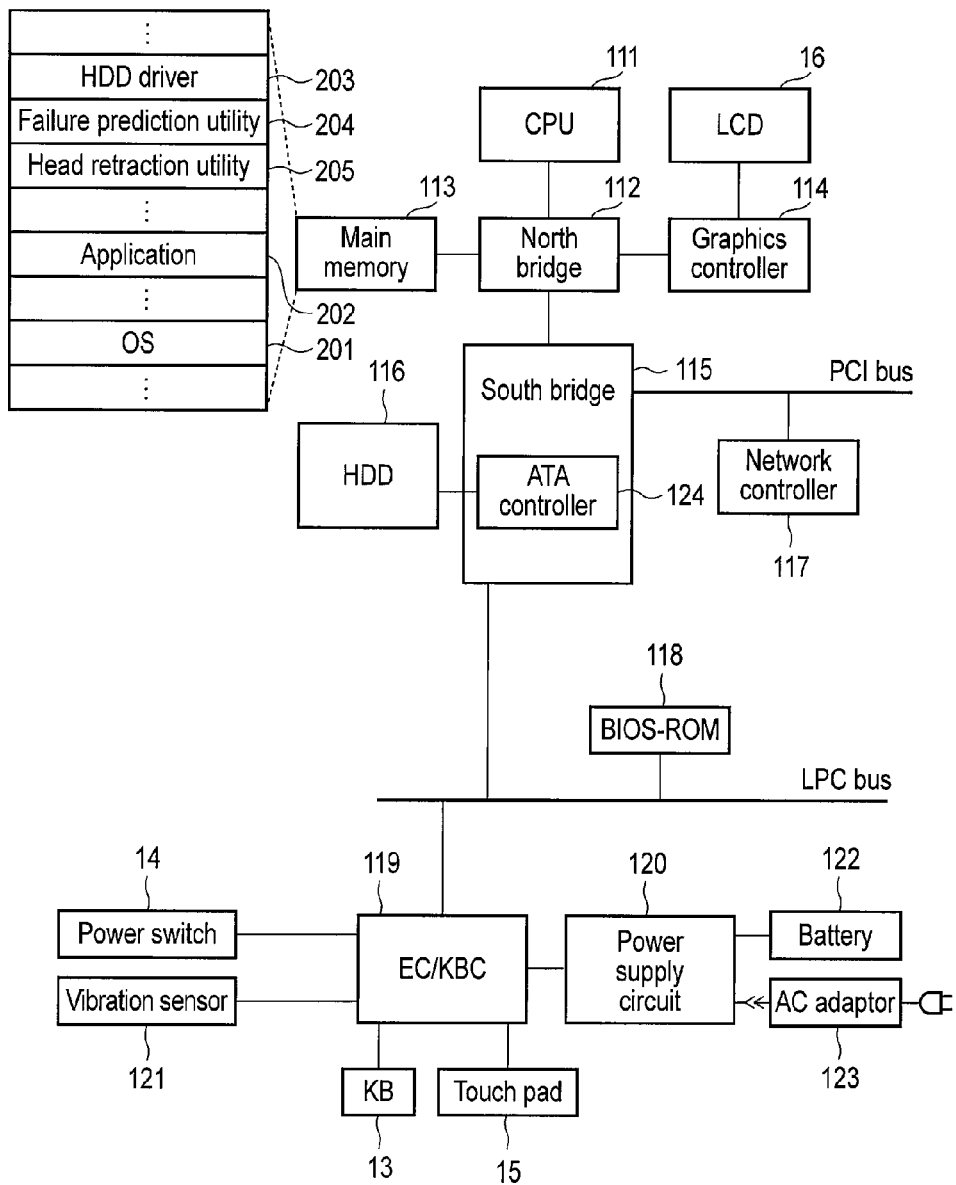
F I G. 2

ELECTRONIC DEVICE, METHOD AND STORAGE MEDIUM

CROSS-REFERENCE TO RELATED APPLICATIONS

This application is based upon and claims the benefit of priority from Japanese Patent Application No. 2013-245740, filed Nov. 28, 2013, the entire contents of which are incorporated herein by reference.

FIELD

Embodiments described herein relate generally to a technique of changing a sensitivity level set for an HDD protection function provided in an electronic device.

BACKGROUND

In general, in electronic devices, such as personal computers, a hard disk drive (HDD) is used as a storage device. The hard disk drive is a disk drive that stores data in a disk storage medium called a hard disk.

For the purpose of, for example, protection of the data stored in a disk storage medium, many disk drives and many electronic devices with disk drives have, for example, an HDD protection function of retracting a magnetic head to a safety position when impact (vibration) exerted on the electronic devices is detected. More specifically, the HDD protection function is a function of retracting the magnetic head to a safety position when the vibration exerted on the electronic device exceeds a predetermined threshold. The threshold is also called a sensitivity level, which is normally set manually by a user.

However, it is difficult for the user to determine which sensitivity level is appropriate to the current state of the electronic device, and therefore there is a demand for a new technique capable of overcoming this difficulty.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 2 is a block diagram showing the system configuration of the electronic device of the embodiment.

DETAILED DESCRIPTION

Various embodiments will be described hereinafter with reference to the accompanying drawings.

In general, according to one embodiment, an electronic device includes a housing, a sensor, a disk device, a first determination controller, a first changing controller. The sensor senses a vibration of the housing. The disk device stores operation data, the disk device including a head, wherein the head retracts to a safety position when the sensed vibration exceeds a sensitivity level, and the operation data includes an evaluated value for evaluating an operation state of the head, and a threshold corresponding to the evaluated value. The first determination controller determines whether the evaluated value exceeds the threshold. The first changing controller changes the sensitivity level based on the result of the first determination controller.

Figure 1:
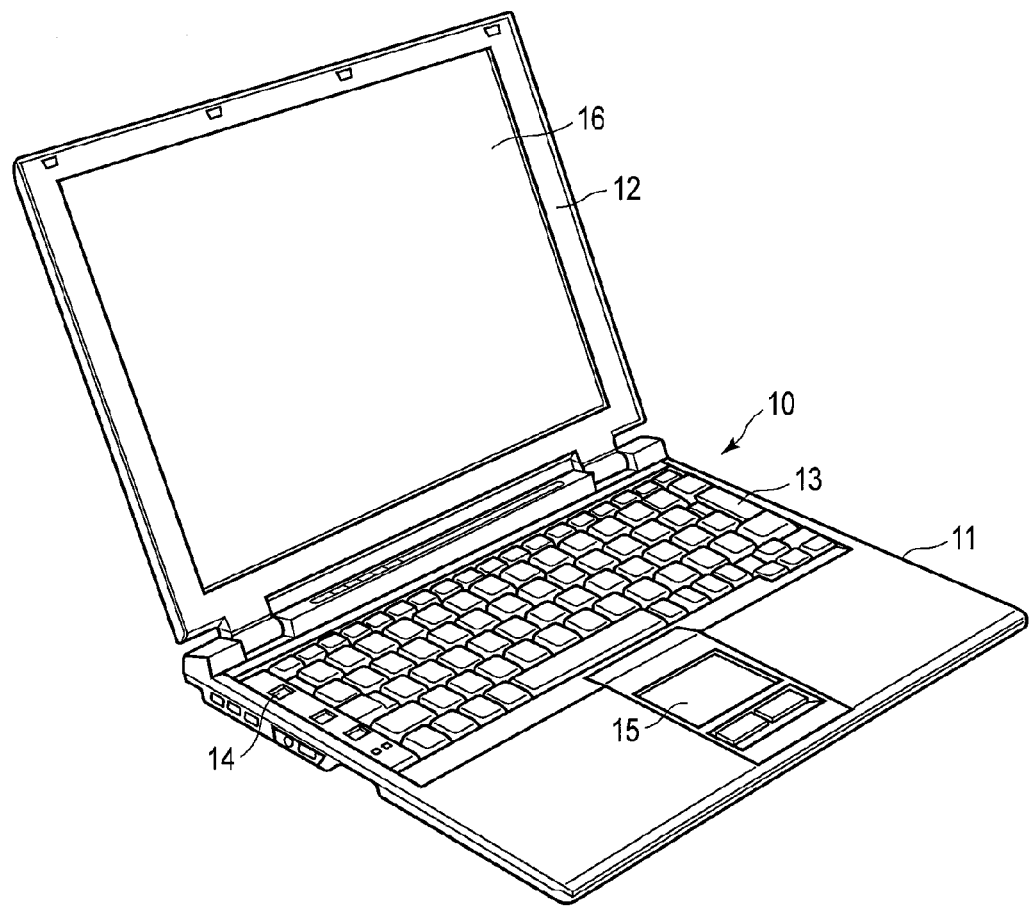
FIG. 1 is a perspective view of the outward appearance of an electronic device according to an embodiment.

Referring first to FIGS. 1 and 2, the structure of the electronic device of the embodiment will be described. The electronic device is realized as a portable notebook personal computer 10 that can be powered by a battery.

FIG. 1 is a perspective view showing the computer 10 viewed from the front in a state in which a display unit is open.

As shown, the computer 10 includes a computer main unit (housing) 11 and a display unit 12. The display unit 12 incorporates a display device such as a liquid crystal display (LCD) 16. A display screen of the LCD 16 is positioned at substantially the central portion of the display unit 12.

The display unit 12 is supported by the computer main unit 11. The display unit 12 is attached to the computer main unit 11 so as to be rotatable between an open position in which an upper surface of the computer main unit 11 is exposed and a closed position in which an upper surface of the computer main unit 11 is covered with the display unit 12. The computer main unit 11 has a thin box-shaped. A keyboard 13, a power switch 14 for turning on/off the computer 10, and a touch pad 15 are arranged on an upper surface of the housing.

FIG. 2 shows the system configuration of the computer 10.

As shown, the computer 10 includes a CPU 111, a north bridge 112, a main memory 113, a graphics controller 114, a south bridge 115, a hard disk drive (HDD) 116, a network controller 117, a BIOS-ROM 118, an embedded controller/keyboard controller IC (EC/KBC) 119, a power supply circuit 120, a vibration sensor 121, etc.

The CPU 111 is a processor for controlling the operation of each component of the computer 10. The CPU 111 executes various programs loaded from the HDD 116 to the main memory 113. The main memory 113 stores an operating system (OS) 201, an application program 202, an HDD driver program 203, a failure prediction utility program 204 and a head retraction utility program (HDD protection utility program) 205, etc.

The HDD driver program 203 is a program for controlling the HDD 116 in response to access requests from the OS 201 and various programs. The HDD driver program 203 is also called an HDD driver. The HDD driver program 203 issues a command corresponding to each access request to the HDD 116, and receives a response from the HDD 116 after the HDD 116 executes processing (read/write) corresponding to each command.

The failure prediction utility program 204 is a program capable of determining existence/non-existence of a failure in the HDD 116. More specifically, the failure prediction utility program 204 acquires, from the HDD 116 via the HDD driver program 203, S.M.A.R.T data by executing S.M.A.R.T (Self-Monitoring, Analysis and Reporting Technology) included in the HDD 116, thereby determining whether the HDD 116 has a failure, based on the S.M.A.R.T data. The S.M.A.R.T data is time-sequence data indicating the operation state of the HDD 116. For facilitating the description, the S.M.A.R.T data will be referred to as operation data. Also for facilitating the description, a description that the HDD driver program 203 is used when the failure prediction utility program 204 acquires the operation data from the HDD 116 will be omitted below.

The operation data is data in which each inspection item name is associated with the value (evaluated value) obtained as a result of S.M.A.R.T execution on each inspection item. The inspection item names include, for example, "Seek Error Rate" (the rate of errors occurring when the magnetic head is sought to a track on which target data exists), "Read Error Rate" (the rate of errors occurring when data is read from the HDD 116), and "Seek Time Performance" (the average time required for seeking the magnetic head). The values resulting from the S.M.A.R.T executed in association with each inspection item include a current value, a worst value, a raw value, etc. In addition to the above-mentioned current value, worst value and raw value, the values resulting from the S.M.A.R.T executed in association with each inspection item include a threshold preset for each inspection item.

A head retraction utility program 205 is a program for controlling, when impact (vibration) exerted on the computer 10 has been sensed, the HDD protection function configured to retract the magnetic head used to read each data item or program stored in the HDD 116 to a safety position. More specifically, the head retraction utility program 205 is a program for appropriately changing a sensitivity level that is used to switch the ON/OFF state of the HDD protection function. The sensitivity level includes, for example, Levels 0 to 3. The Level 0 is Level at which the HDD protection function is not turned on even when significant vibration has been sensed. The Level 1 is Level at which the HDD protection function is turned on only when significant vibration has been sensed. The Level 2 is Level at which the HDD protection function is turned on also when middle-level vibration has been sensed. The Level 3 is Level at which the HDD protection function is turned on even when small vibration has been sensed. These sensitivity levels are arbitrarily stored as setting information in, for example, a memory (not shown) by the head retraction utility program 205.

The CPU 111 executes the basic input output system (BIOS) stored in the BIOS-ROM 118. The BIOS is a program for hardware control.

The north bridge 112 is used to connect the local bus of the CPU 111 to the south bridge 115. The north bridge 112 also has a function of communicating with the graphics controller 114 via, for example, an accelerated graphics port (AGP) bus. Further, the north bridge 112 contains a memory controller for controlling the main memory 113.

The graphics controller 114 is a display controller for controlling the LCD 16 that is used as the display monitor of the computer 10. The south bridge 115 is connected to a peripheral component interconnect (PCI) bus and to a low pin count (LPC) bus.

Further, the south bridge 115 contains an ATA controller 124. The ATA controller 124 controls the HDD 116 in accordance with a request from the HDD driver program 203.

The HDD 116 is a disk drive that stores various programs, data, etc. In response to access requests from the OS 201 and various programs, operations of reading and writing designated data (such as a user file and a system file) are performed on the HDD 116. The HDD 116 is a magnetic disk drive that magnetically records data.

The embedded controller/keyboard controller IC (EC/KBC) 119 is a one-chip microcomputer in which an embedded controller for power supply management, and a keyboard controller for controlling the keyboard (KB) 13, the touch pad 15 and the like, are integrated. The EC/KBC 119 cooperates with the power supply circuit 120 to turn on/off the computer 10 in accordance with a user's operation of the power switch 14. The power supply circuit 120 generates a system power to be supplied to each component of the computer 10, using an external power supplied via a battery 122 contained in the computer main unit 11, or an AC adaptor 123.

The vibration sensor 121 is, for example, a triaxial acceleration sensor, and is configured to sense the vibration exerted on the computer 10 and to output a numerical value corresponding to the sensed vibration to the EC/KBC 119. If, for example, the vibration sensor 121 is a triaxial acceleration sensor, it calculates an acceleration value from the acceleration exerted on the computer 10, and outputs the calculated acceleration value to the EC/KBC 119. As a result, the EC/KBC 119 can predict what degree of vibration is exerted on the computer 10, based on the acceleration value output from the vibration sensor 121. If the predicted vibration degree (value) exceeds the sensitivity level, the above-described HDD protection function operates to retreat the magnetic head to a safety position.

A brief description will be given of a procedure example of failure prediction processing executed by the CPU 111 using the failure prediction utility program 204.

Firstly, the failure prediction utility program 204 acquires time-sequence operation data from the HDD 116. Subsequently, the failure prediction utility program 204 calculates an explanatory variable (independent variable) based on the acquired operation data. For instance, if the operation data is associated with the "Read Error Rate," the failure prediction utility program 204 calculates an explanatory variable (e.g., the standard deviation of most recent 15 values corresponding to the "Read Error Rate"), assuming that the "Read Error Rate" is an explained variable (dependent variable).

After that, the failure prediction utility program 204 calculates the failure probability of the computer 10 based on the calculated explanatory variable. Thereafter, the failure prediction utility program 204 determines a failure rank based on the calculated failure probability. The failure rank is an index indicating the degree of failure, and is expressed by, for example, "normal," "warning," "abnormal," etc. Namely, the failure prediction utility program 204 determines which one of "normal," "warning," "abnormal," etc., the failure rank corresponds to.

As described above, the failure prediction utility program 204 determines existence/non-existence of failure in the HDD 116. In other words, the failure prediction utility program 204 determines whether the HDD 116 has a possibility of failure. The failure prediction processing realized by executing the failure prediction utility program 204 is not limited to the above-mentioned method. It is sufficient if the method can determine existence/non-existence of failure in the HDD 116.

Figure 3:
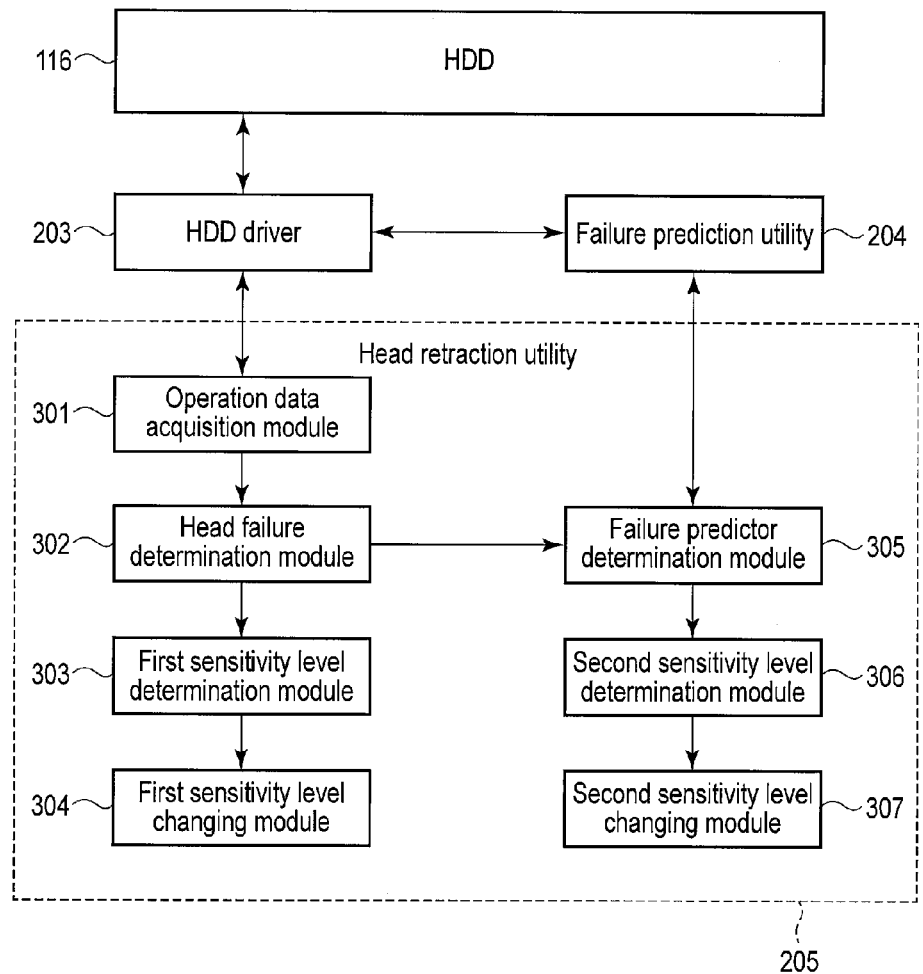
FIG. 3 is a block diagram showing the function structure of a head retraction utility program executed by the electronic device of the embodiment.

Referring then to FIG. 3, a description will be given of the function structure of the head retraction utility program 205.

The head retraction utility program 205 includes an operation data acquisition module 301, a head failure determination module 302, a first sensitivity level determination module 303, a first sensitivity level changing module 304, a failure predictor determination module 305, a second sensitivity level determination module 306, a second sensitivity level changing module 307, etc.

The operation data acquisition module 301 acquires operation data from the HDD 116. More specifically, the operation data acquisition module 301 outputs, to the HDD driver program 203, an access request to acquire operation data as an inspection item associated with the magnetic head, which is included in a plurality of operation data items stored in the HDD 116. The operation data as an inspection item associated with the magnetic head hereinafter referred to simply as "head operation data." The operation data acquisition module 301 acquires head operation data via the HDD driver program 203. The acquired head operation data is sent to the head failure determination module 302.

The head failure determination module 302 determines existence/non-existence of failure in the magnetic head, based on the head operation data. In other words, it determines whether the magnetic head has a possibility of failure. More specifically, the head failure determination module 302 compares (monitors) the current value included in the head operation data with a threshold included in the head operation data, thereby determining whether the current value exceeds the threshold. If it is determined that the current value exceeds the threshold, the head failure determination module 302 determines that the magnetic head has a failure (or has a possibility of failure). In contrast, if it is determined that the current value does not exceed the threshold, the head failure determination module 302 determines that the magnetic head has no failure. Although in the embodiment, the head failure determination module 302 uses the current value as a comparison target to be compared with the threshold included in the head operation data, but the worst value or the raw value included in the head operation data may be used as the comparison target.

As described above, the head failure determination module 302 determines existence/non-existence of failure in the magnetic head, sequentially using all head operation data acquired by the operation data acquisition module 301.

The first sensitivity level determination module 303 determines whether a current sensitivity level used to switch the ON/OFF of the HDD protection function is set to a minimum sensitivity level, referring to a memory (not shown), if the head failure determination module 302 has determined that the magnetic head has a failure. Although in the embodiment, the minimum sensitivity level is set to the above-mentioned "Level 1," the embodiment is not limited to this, but may be set to the above-mentioned "Level 0."

If the first sensitivity level determination module 303 has determined that the sensitivity level is set to the minimum sensitivity level, the first sensitivity level changing module 304 determines that the current sensitivity level is appropriate and hence maintains the current sensitivity level. In contrast, if the first sensitivity level determination module 303 has determined that the sensitivity level is not set to the minimum sensitivity level, the first sensitivity level changing module 304 determines that the current sensitivity level is inappropriate, and hence changes the current sensitivity level. More specifically, the first sensitivity level changing module 304 reduces the current sensitivity level (for example, from "Level 3" to "Level 1"). If the head failure determination module 302 has determined that the magnetic head has no failure, the failure predictor determination module 305 requests the failure prediction utility program 204 to perform failure prediction processing. Further, the failure predictor determination module 305 refers to the result of the failure prediction processing by the failure prediction utility program 204, thereby determining existence/non-existence of failure in the HDD 116. The failure prediction utility program 204 can shorten the time required for failure prediction processing by performing the failure prediction processing using operation data, other than the head operation data, included in a plurality of operation data items stored in the HDD 116.

If the failure predictor determination module 305 has determined that the HDD 116 has a failure, the second sensitivity level determination module 306 refers to a memory (not shown) to determine whether the current sensitivity level used to switch the ON/OFF of the HDD protection function is set to a maximum sensitivity level.

If the second sensitivity level determination module 306 has determined that the current sensitivity level is set to the maximum sensitivity level, the second sensitivity level changing module 307 determines that the current sensitivity level is appropriate and maintains the current sensitivity level. In contrast, if the second sensitivity level determination module 306 has determined that the current sensitivity level is not set to the maximum sensitivity level, the second sensitivity level changing module 307 determines that the current sensitivity level is inappropriate, and hence changes the current sensitivity level. More specifically, the second sensitivity level changing module 307 increases the current sensitivity level (for example, from "Level 1" to "Level 3").

Figure 4:
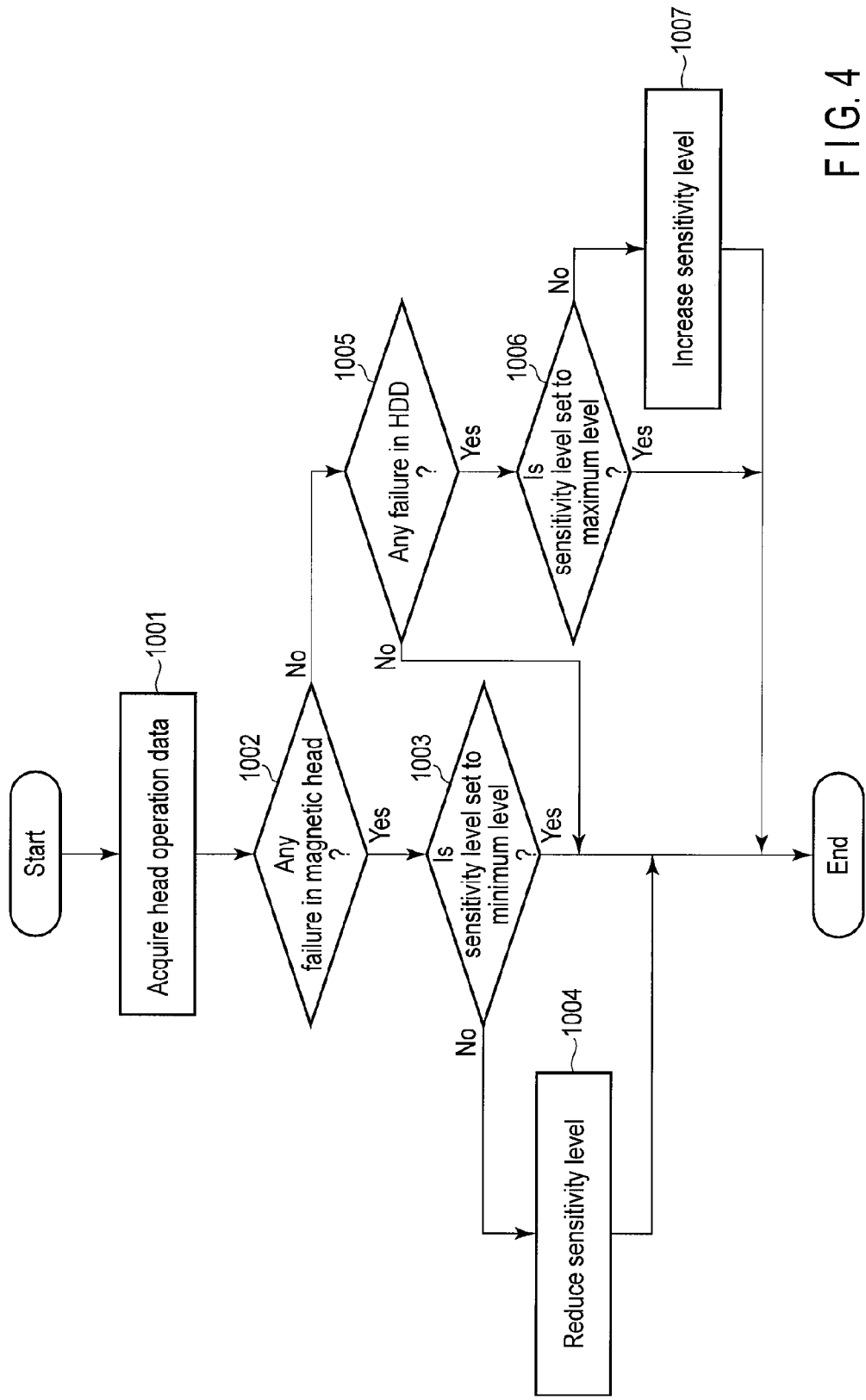
FIG. 4 is a flowchart of a processing example executed by the electronic device of the embodiment using the head retraction utility program.

Referring now to FIG. 4, a description will be given of a procedure of sensitivity level changing processing performed by the head retraction utility program 205.

Firstly, the operation data acquisition module 301 acquires head operation data from the HDD 116 (block 1001). The acquired head operation data is sent to the head failure determination module 302.

Subsequently, the head failure determination module 302 compares the current value with a threshold to determine whether the current value exceeds the threshold, thereby determining existence/non-existence of failure in the magnetic head. The current value and the threshold are included in the head operation data acquired by the operation data acquisition module 301 (block 1002). If it is determined that the magnetic head have no failure, the processing in block 1005, described later, is performed.

If it is determined that the magnetic head has a failure, namely, if the current value in the head operation data exceeds the threshold (Yes in block 1002), the first sensitivity level determination module 303 determines whether the current sensitivity level is set to the minimum sensitivity level. More specifically, the first sensitivity level determination module 303 refers to the setting information stored in a memory (not shown), thereby determining whether the current sensitivity level is set to the minimum sensitivity level (block 1003). If it is determined that the current sensitivity level is set to the minimum sensitivity level (Yes in block 1003), the sensitivity level changing processing is finished, with the current sensitivity level maintained.

In contrast, if it is determined that the current sensitivity level is not set to the minimum sensitivity level (No in block 1003), the first sensitivity level changing module 304 reduces the current sensitivity level (block 1004), thereby finishing the sensitivity level changing processing.

Further, if it is determined that the magnetic head has no failure, i.e., if the current value in the head operation data does not exceed the threshold (No in block 1002), the failure predictor determination module 305 requests the failure prediction utility program 204 to perform failure prediction processing. After that, the failure predictor determination module 305 refers to the result of the failure prediction processing, thereby determining existence/non-existence of failure in the HDD 116 (block 1005). If it is determined that the HDD 116 has no failure (No in block 1005), the sensitivity level changing processing is finished, with the current sensitivity level maintained.

In contrast, if it is determined that the HDD 116 has a failure (Yes in block 1005), the second sensitivity level determination module 306 determines whether the current sensitivity level is set to the maximum sensitivity level, referring to a memory (not shown) (block 1006). If it is determined that the current sensitivity level is set to the maximum sensitivity level (Yes in block 1006), the sensitivity level changing processing is finished, with the current sensitivity level maintained.

If it is determined that the current sensitivity level is not set to the maximum sensitivity level (No in block 1006), the second sensitivity level changing module 307 increases the current sensitivity level (block 1007), thereby finishing the sensitivity level changing processing.

Although in the embodiment, the first sensitivity level determination module 303 determines whether the current sensitivity level is set to the minimum sensitivity level, this may be modified, for example, such that the current sensitivity level is set to a lower sensitivity level. More specifically, the first sensitivity level determination module 303 may determine that the current sensitivity level is the lower sensitivity level, if it is the above-mentioned "Level 0" or "Level 1." Also, the first sensitivity level determination module 303 may determine that the current sensitivity level is not the lower sensitivity level, if it is the above-mentioned "Level 2" or "Level 3."

Similarly, although the second sensitivity level determination module 306 determines whether the current sensitivity level is set to the maximum sensitivity level, this may be modified, for example, such that the current sensitivity level is set to a higher sensitivity level. More specifically, the second sensitivity level determination module 306 may determine that the current sensitivity level is not the higher sensitivity level, if it is the above-mentioned "Level 0" or "Level 1." Also, the second sensitivity level determination module 306 may determine that the current sensitivity level is the higher sensitivity level, if it is the above-mentioned "Level 2" or "Level 3."

As described above, the computer 10 of the embodiment has a head retraction utility program 205 for determining existence/non-existence of failure in the magnetic head based on the head operation data stored in the HDD 116, and reducing the sensitivity level used to switch the ON/OFF of the HDD protection function, if determining that the magnetic head has a failure. The head retraction utility program 205 also increases the sensitivity level used to switch the ON/OFF of the HDD protection function, if determining that the HDD 116 has a failure. Namely, the computer 10 can set a sensitivity level appropriate to the current state of the electronic device, using the head retraction utility program 205.

Further, when the magnetic head has a possibility of failure, if a high sensitivity level is maintained, the HDD protection function may accelerate the failure of the magnetic head. However, as mentioned above, where there is a possibility of failure in the magnetic head, the head retraction utility program 205 can reduce the sensitivity level used to switch the ON/OFF of the HDD protection function. As a result, the possibility of failure in the magnetic head can be reduced.

In addition, as described above, the head retraction utility program 205 determines existence/non-existence of failure in the magnetic head before determining existence/non-existence of failure in the HDD 116, and determines existence/non-existence of failure in the HDD 116 if determining that the magnetic head has no failure. As a result, even when a failure has been detected in the HDD 116, it can be estimated that the cause of the failure in the HDD 116 exists in something other than a failure in the magnetic head. Further, since the cause of the failure in the HDD 116 can be estimated to exist in something other than a failure in the magnetic head, the sensitivity level for the HDD protection function can be increased safely, thereby reducing the degree of evolution of the failure in the HDD 116.

The processing performed in the embodiment can be realized by a computer program. Therefore, the same advantage as that of the embodiment can be easily obtained by installing the computer program in a computer through a computer-readable recording medium storing the computer program.

The above-described embodiment is presented just as an example, and is not intended to limit the scope of the invention. The embodiment may be modified in various ways without departing from the scope. For instance, various omissions, replacements, changes, etc., may be made. These embodiment and their modifications are included in the inventions recited in the claims and the equivalents of the inventions.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device comprising:
   a housing;
   a sensor to sense a vibration of the housing;
   a disk device to store operation data, the disk device comprising a head, wherein the head retracts to a safety position when the sensed vibration exceeds a sensitivity level, and the operation data comprises an evaluated value for evaluating an operation state of the head, and a threshold corresponding to the evaluated value;
   a first determination controller to determine whether the evaluated value exceeds the threshold; and
   a first changing controller to change the sensitivity level based on the result of the first determination controller.

2. The electronic device of claim 1, wherein the first changing controller comprises:
   a second determination controller to determine whether a current sensitivity level is lower than a preset sensitivity level, when the first determination controller has determined that the evaluated value exceeds the threshold; and
   a second changing controller to reduce the current sensitivity level, when the second determination controller has determined that the current sensitivity level is not lower than the preset sensitivity level.

3. The electronic device of claim 2, wherein the first changing controller maintains the current sensitivity level when the second determination controller has determined that the current sensitivity level is lower than the preset sensitivity level.

4. The electronic device of claim 1, wherein the first changing controller comprises:
   a receiving controller to receive a result of a determination as to whether the disk device has a failure, when the first determination controller has determined that the evaluated value does not exceed the threshold; and
   a third changing controller to increase a current sensitivity level when the received result indicates that the disk device has the failure.

5. The electronic device of claim 4, wherein the first changing controller maintains the current sensitivity level when the received result indicates that the disk device has no failure.

6. A method for use in an electronic device comprising a housing, a sensor to sense a vibration of the housing, a disk device to store operation data and comprising a head, wherein the head retracts to a safety position when the sensed vibration exceeds a sensitivity level, and the operation data comprises an evaluated value for evaluating an operation state of the head, and a threshold corresponding to the evaluated value, the method comprising:
first determining whether the evaluated value exceeds the threshold; and
changing the sensitivity level based on a result of the first determining.

7. The method of claim 6, wherein
the changing the sensitivity level comprises:
second determining whether a current sensitivity level is lower than a preset sensitivity level, when the result of the first determining indicates that the evaluated value exceeds the threshold; and
reducing the current sensitivity level when a result of the second determining indicates that the current sensitivity level is not lower than the preset sensitivity level.

8. The method of claim 7, wherein
the changing the sensitivity level comprises maintaining the current sensitivity level when the result of the second determining indicates that the current sensitivity level is lower than the preset sensitivity level.

9. The method of claim 6, wherein
the changing the sensitivity level comprises:
receiving a result of a determination as to whether the disk device has a failure, when the first determining indicates that the evaluated value does not exceed the threshold; and
increasing a current sensitivity level when the acquiring the result indicates that the disk device has the failure.

10. The method of claim 9, wherein the changing the sensitivity level comprises maintaining the current sensitivity level when the receiving the result indicates that the disk device has no failure.

11. A non-transitory computer-readable storage medium storing instructions executed by a computer comprising a housing, a sensor to sense a vibration of the housing, a disk device to store operation data and comprising a head, wherein the head retracts to a safety position when the sensed vibration exceeds a sensitivity level, and the operation data comprises an evaluated value for evaluating an operation state of the head, and a threshold corresponding to the evaluated value, and wherein the instructions, when executed by the computer, cause the computer to perform a method comprising:
first determining whether the evaluated value included in the stored operation data exceeds the threshold; and
changing the sensitivity level based on a result of the first determining.

12. The storage medium of claim 11, wherein the changing the sensitivity level comprises:
second determining whether a current sensitivity level is lower than a preset sensitivity level, when the result of the first determining indicates that the evaluated value exceeds the threshold; and
reducing the current sensitivity level when a result of the second determining indicates that the current sensitivity level is not lower than the preset sensitivity level.

13. The storage medium of claim 12, wherein
the changing the sensitivity level comprises maintaining the current sensitivity level when a result of the second determining indicates that the current sensitivity level is lower than the preset sensitivity level.

14. The storage medium of claim 11, wherein
the changing the sensitivity level comprises:
receiving a result of a determination as to whether the disk device has a failure, when the first determining indicates that the evaluated value does not exceed the threshold; and
increasing a current sensitivity level when the receiving the result indicates that the disk device has the failure.

15. The storage medium of claim 14, wherein the changing the sensitivity level comprises maintaining the current sensitivity level when the receiving the result indicates that the disk device has no failure.

* * * * *